Figures 1, 2:
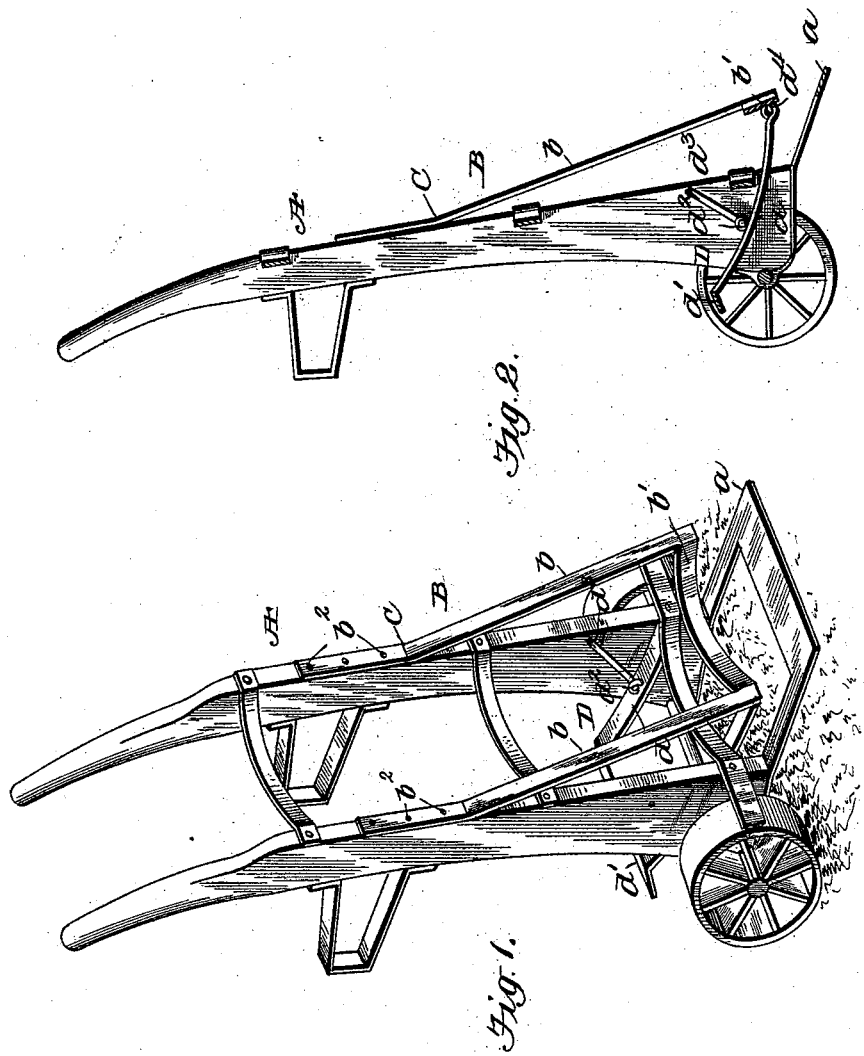

(No Model.)

J. B. RANDALL.
TRUCK.

No. 528,443. Patented Oct. 30, 1894.

Witnesses
John Irvine
Wm. S. Dodges.

Inventor
Jabez B. Randall
By Alland Rutherford
Attorney

UNITED STATES PATENT OFFICE.

JABEZ B. RANDALL, OF SANFORD, FLORIDA.

TRUCK.

SPECIFICATION forming part of Letters Patent No. 528,443, dated October 30, 1894.

Application filed May 12, 1894. Serial No. 511,057. (No model.)

*To all whom it may concern:*

Be it known that I, JABEZ B. RANDALL, a citizen of the United States, residing at Sanford, in the county of Orange and State of Florida, have invented certain new and useful Improvements in Trucks; and I do hereby declare the following to be a full, clear, and exact description of the invention, such as will enable others skilled in the art to which it appertains to make and use the same.

This invention contemplates certain new and useful improvements in trucks, for warehouses and the like, and has for its object the production of simple and inexpensive means for readily and easily effecting the discharging or unloading of a truck.

The invention consists of a truck having across its front a supplementary frame against which the load is designed to bear, and means extending in rear of the truck and secured thereto for forcing said frame outwardly causing the article or load carried by the truck to be discharged therefrom.

The invention also comprises the details of construction, combination and arrangement of parts, substantially as hereinafter fully set forth and particularly pointed out in the claims.

In the accompanying drawings:—Figure 1 is a view in perspective of my improved truck. Fig. 2 is a vertical longitudinal sectional view thereof.

Referring to the drawings, A designates the truck, which may be of the ordinary form of two-wheel trucks, being provided with the usual end piece $a$ upon or against which bears the load to be carried.

B is a frame composed of two parallel longitudinal bars $b$ connected at their outer ends by an inwardly curved cross-bar $b'$, the inner ends of said bars $b$ being secured by screws or bolts $b^2$ to the side beams of the truck. These bars or beams are bent outwardly from the point C so as to give spring to the frame B, the outer end of which is thus thrown away from the truck. The weight of any load carried by the truck forces this frame B inwardly against the truck, or nearly so.

D is a lever-frame pivotally connected to truck A and also to the outer end of frame B. This lever-frame is composed of two curved side-bars $d$ and a connecting cross-bar $d'$. With eyes $d^2$ extending from the side-bars $d$ engage the lower hooked ends of short rods $d^3$ pivotally secured to the side-bars of the truck-frame. The lever-frame is connected to the cross-bar of frame B by the hooked ends of the side-bars of the former engaging eyes $d^4$ of the latter.

In practice, when it is desired to dump or discharge the load or weight carried by the truck, the latter being in a nearly perpendicular position, the operator bears with his foot upon the lever-frame, and the latter swinging on the pivoted arms will throw the free end of the frame B outwardly and effect the easy discharge of the load or weight from the truck. Upon removal of pressure from the lever-frame, the frame B will spring back to its normal position.

The advantages of my invention are apparent and it will be specially observed that by means thereof the unloading of a truck is greatly facilitated and that the means employed are simple and inexpensive and not liable to readily get out of order or be deranged.

I claim as my invention—

1. A truck having its frame provided with a lower end-piece projecting therefrom and a supplementary frame secured to said truck frame at one end and free at its other end, and mechanical means connected to said free end of said supplementary frame and also connected to said truck frame, whereby the former may be forced outward away from the latter by the operator pressing his foot against said mechanical means, substantially as set forth.

2. A truck having its frame provided with an end-piece projecting therefrom and a supplementary frame secured to said truck frame at one end and free at its other end, and a lever-frame connected to said free end of said former frame and fulcrumed on said truck frame, substantially as set forth.

3. A truck having a frame extending over its front face and secured thereto at one end and free at its other end, a lever frame, connected to said former frame, and rods pivoted to said truck and forming the fulcra for said lever frame, substantially as set forth.

4. The combination with a truck, of a frame having spring-bars secured to said truck, and a lever-frame fulcrumed on said truck and connected to said former frame, substantially as set forth.

5. The combination with a truck, of a frame having corresponding side-bars secured to said truck at one end, and a cross-bar connecting the free ends of said side-bars, the lever-frame having side-bars connected to said former frame, and pivoted rods forming the fulcra for said lever-frame, substantially as set forth.

6. The herein-described improved truck having a frame composed of two outwardly bent longitudinal bars connected at one end to said truck and free at their outer ends, a curved cross-bar connected to said free ends of said bars, a lever-frame having two curved side-bars and a cross-bar, said side-bars being provided with eyes and hooked at their outer ends to engage eyes of said cross-bar of said former frame, and the rods pivoted to said truck having hooked ends engaging said eyes of said lever-frame, substantially as set forth.

In testimony whereof I affix my signature in presence of two witnesses.

JABEZ B. RANDALL.

Witnesses:
CHAS. S. PARTRIDGE,
WM. H. HYNES.